United States Patent
Tassan Mangina et al.

(10) Patent No.: US 10,123,654 B2
(45) Date of Patent: Nov. 13, 2018

(54) APPARATUS FOR COOKING FOOD PRODUCTS INCLUDING A DETACHABLE PLATE

(71) Applicant: Electrolux Professional S.p.A., Pordenone (IT)

(72) Inventors: Franco Tassan Mangina, Marsure (IT); Marino Fadelli, Colle Umberto (IT); Fabio Sinatra, Cervignano del Friuli (IT); Antonio Asquini, Pasian di Prato (IT)

(73) Assignee: Electrolux Professional S.p.A., Pordenone (IT)

( * ) Notice: Subject to any disclaimer, the term of this patent is extended or adjusted under 35 U.S.C. 154(b) by 1265 days.

(21) Appl. No.: 13/904,705

(22) Filed: May 29, 2013

(65) Prior Publication Data

US 2013/0333576 A1 Dec. 19, 2013

(30) Foreign Application Priority Data

May 31, 2012 (EP) .................................. 12170249

(51) Int. Cl.
*A47J 37/06* (2006.01)

(52) U.S. Cl.
CPC ....... *A47J 37/0676* (2013.01); *A47J 37/0611* (2013.01)

(58) Field of Classification Search
CPC . A47J 37/0611; A47J 37/06; A47J 2037/0617
USPC ......... 99/349, 350, 351, 372, 376, 377, 340, 99/450, 444–446
See application file for complete search history.

(56) References Cited

U.S. PATENT DOCUMENTS

| | | | | |
|---|---|---|---|---|
| 6,247,392 | B1* | 6/2001 | Yung | A47J 37/0611 220/23.87 |
| 8,747,933 | B1* | 6/2014 | McGinn | A23L 1/0121 220/319 |
| 2004/0050256 | A1* | 3/2004 | Patenotre | A47J 37/0611 99/331 |

(Continued)

FOREIGN PATENT DOCUMENTS

DE 2535313 2/1977

OTHER PUBLICATIONS

European Search Report for EP12170249, dated Nov. 13, 2012, 1 page.

*Primary Examiner* — Tu B Hoang
*Assistant Examiner* — Alba Rosario-Aponte
(74) *Attorney, Agent, or Firm* — Pearne & Gordon LLP

(57) ABSTRACT

An apparatus for cooking food products is provided. The apparatus includes at least one heating plate having a surface provided with alternate crests and troughs. The apparatus further comprises a fixing system adapted to detachably fix a corrugated protective plate, having a non-stick face, to said heating plate. The corrugated protective plate has a first and a second corrugated edge and alternate crests and troughs extending from the first to the second corrugated edge and adapted to match the alternate crests and troughs of the heating plate when the corrugated protective plate is fixed to the heating plate. Said fixing system comprises fixing elements adapted to exert a force on corresponding portions of the protective plate close to the first or the second corrugated edge so as to push the protective plate against the heating plate.

17 Claims, 10 Drawing Sheets

(56) References Cited

U.S. PATENT DOCUMENTS

| | | | |
|---|---|---|---|
| 2005/0247209 A1* | 11/2005 | Kuo | A47J 37/0611 99/372 |
| 2007/0034094 A1* | 2/2007 | Tatham | A22C 7/0046 99/450.2 |
| 2008/0105137 A1* | 5/2008 | Genslak | A47J 37/0611 99/350 |
| 2008/0116193 A1 | 5/2008 | Lam | |

* cited by examiner

APPARATUS FOR COOKING FOOD PRODUCTS INCLUDING A DETACHABLE PLATE

The present invention refers to the cookware field.

Widely known in the art are currently broilers, or griddles, that are used to cook food products of the most varied kind, such as hamburgers, toasted rolls, meat in general, and the like. These griddles use contact heating or infrared radiation as a process to cook such products. A number of griddles to be found currently on the marketplace have—further to a lower or bottom heating element on which the products to be cooked are placed—an upper or top heating element that is adapted to be brought in proximity of the lower or bottom one so as to have the products cooked on both sides simultaneously, thereby reducing the overall time required to handle the same products.

Both the upper and the lower elements comprise a respective heating plate made of a material resistant to high temperatures—such as glass ceramic, aluminum, iron, cast iron plate or the like.

The known devised and practiced solutions provides for coating the heating plates with non-stick layers, such as Teflon®, to avoid food sticking to it when cooked. A drawback encountered with said known griddles concerns the cleaning operations of such coated heating plates. Indeed, in order to preserve the non-stick effect guaranteed by the coatings, the heating plates should be cleaned with great care, avoiding the use of harsh detergents and cleaning tools which cause an excessive rubbing force. However, users of griddles typically do not follow these recommendations, since a correct cleaning operation would require an excessive amount of time. Instead, heating plates are frequently cleaned using aggressive cleaning tools, such as steel wool pads or steel scouring pads. In this way, the non-stick layers rapidly degrade, thus causing food remaining stuck to the heating plates.

According to a solution known in the art, disposable backing paper sheets are inserted between the food to be cooked and the heating plates. However, the backing paper sheets are made in materials (e.g., Polytetrafluoroethylene) having a relatively low thermal conductivity, reducing thus the efficiency of the cooking process. In any case, a solution of this type cannot be efficiently employed in those griddle types having one or both heating plates with corrugated surfaces provided with crests and troughs adapted to impress branding marks on the food to be cooked similar to what might be found on a charbroiler. In this case, the presence of backing paper sheets between food and heating plate sensibly impedes the generation of branding marks on the food and avoids the crests to penetrate into the food, reducing the thermal exchange between food and heating plate.

DE2535313 discloses a grill cooker having a lower fixed hot plate and an upper movable hot plate. The useful surface of at least one of these plates is covered by a heat-conductive grid plate which is detachably held on the hot plate so that it quickly heats up for use but can easily removed for cleaning. The hot plates are preferably smooth so that the lower plate can also be used as an ordinary cooking hot plate when the grid is removed and the grid itself is preferably a corrugated plate whose crests form the grid and whose troughs contact the hot plate to provide for rapid heat transfer. If a stack of grids are provided, the grill can be used constantly by replacing the dirty grids with clean grids without switching off the cooker.

The solution disclosed in DE2535313 provides for using a metal sheet to cover the heat-conductive grid plate. The metal sheet is made corrugated in such a way to follow the corrugated profile of the heat-conductive grid plate, with crests (and troughs) extending along the surface of the metal sheet from a first edge to an opposite second edge thereof.

In DE2535313, the metal sheet is fixed to the heat-conductive grid plate by sliding the side edges of the metal sheet, i.e., the sides thereof parallel to the direction of the crests and troughs, into corresponding lateral guides located at the side of the heat conductive grid plate. The Applicant has observed that a solution of this type is not efficient. Indeed, using such lateral guides, the flexible sheet metal plate is attached to the heat-conductive grid plate by means of compression forces applied only at the side edges of the metal sheet, i.e., the edges thereof parallel to the direction along which the crests (and troughs) extend. However, this peculiar shape of the metal sheet, does not guarantee that the metal sheet itself adheres to the heat-conductive grid plate, because of elastic deformations, especially in the central portion thereof, thus reducing heat transfer from the grid plate to the food. Indeed, the presence of crests and troughs extending along the surface of the metal sheet from the first edge to the opposite second edge does not avoid that the metal sheet may detach from the grid plate by a distance which increases, moving from a side edge to the opposite side edge of the metal sheet, as approaching the central portion of the metal sheet.

In view of the above, the Applicant has handled the problem of improving the already known solutions for providing a heating plate of a cooking apparatus with a non-stick surface which can be easily handled, in terms of replaceability and cleanability, without impeding the thermal exchange between food and heating plate.

An aspect of the present invention relates to an apparatus for cooking food products. The apparatus includes at least one heating plate having a surface provided with alternate crests and troughs. The apparatus further comprises a fixing system adapted to detachably fix a corrugated protective plate, having a non-stick face, to said heating plate. The corrugated protective plate has a first and a second corrugated edge and alternate crests and troughs extending from the first to the second corrugated edge and adapted to match the alternate crests and troughs of the heating plate when the corrugated protective plate is fixed to the heating plate. Said fixing system comprises fixing elements adapted to exert a force on corresponding portions of the protective plate close to the first or the second corrugated edge so as to push the protective plate against the heating plate.

According to an embodiment of the present invention, wherein each fixing element is switchable between a locked configuration, in which the fixing element engages the protective plate to exert a force on the corresponding portion of the protective plate close to the first or the second corrugated edge, respectively, and an unlocked configuration, in which the fixing element is disengaged from the protective plate.

According to an embodiment of the present invention, the apparatus includes an apparatus member supporting the heating plate; the alternate crests and troughs of the heating plate extend along a first direction; the heating plate has a first and a second edge opposite to each other and substantially perpendicular to the first direction; and each fixing element is mounted on the apparatus member and includes a respective clamping member having at least a portion adapted to extend astride the first or the second edge and the first or the second corrugated edge of the protective plate, when in the locked configuration.

According to an embodiment of the present invention, the clamping member of each fixing element is a flat member provided with a folded engaging section adapted to engage the protective plate when the fixing element is in the locked configuration.

According to an embodiment of the present invention, said folded engaging section includes at least one tooth adapted to engage a corresponding trough of the protective plate when the corresponding fixing element is in the locked configuration.

According to an embodiment of the present invention, the clamping member has an elastically deformable portion so designed that when no force is applied on it, the folded engaging section can engage the protective plate, and when a force sufficient to deform it is applied on it, the folded engaging section is displaced from the protective plate.

According to an embodiment of the present invention, each fixing element includes a respective hindering member comprising a first hindering portion mounted on the apparatus member and a second hindering portion protruding from the apparatus member; each clamping member comprises a first clamping portion fixed to the first hindering portion, a second clamping portion bent with respect to the first clamping portion so as to extend away from the apparatus member, and a third clamping portion bent with respect to the second clamping portion so as to extend astride the first or the second edge of the heating plate and the first or the second corrugated edge of the protective plate when in the locked configuration. The folded engaging section is connected to the third clamping portion.

According to an embodiment of the present invention, when a fixing element is in the locked configuration, the respective second clamping portion is displaced from the apparatus member of a distance higher than the length of the second hindering portion. The fixing element is adapted to be switched to the unlocked configuration by exerting a force on the second clamping portion sufficient to cause the second clamping portion to come into contact with the second hindering portion and cause bending of the second clamping portion.

According to an embodiment of the present invention, each fixing element includes a respective flip locking element comprising a frame structure mounted on the apparatus member, and a handle member rotatably coupled to the frame structure. The clamping member is rotatably coupled to the handle member. A first rotation axis of the handle member with respect to the frame structure is parallel to a second rotation axis of the clamping member with respect to the handle member.

According to an embodiment of the present invention, when the fixing element is in the locked configuration, the handle member is in a position substantially parallel to the heating plate; the fixing element is adapted to be switched between the locked configuration and the unlocked configuration by rotating the handle member with respect to the frame structure so as to translate the second rotation axis with respect to the apparatus member.

According to an embodiment of the present invention, the apparatus comprises a base member associated to a first heating plate adapted to support food products to be cooked, and an upper member associated to a second heating plate. The upper member is movable relative to the base member so that, when the upper member is displaced towards the base member, the second heating plate comes to lie opposite to the first heating plate so as to enclose the food products therebetween. Said at least one heating plate is defined by said first heating plate or by said second heating plate.

According to an embodiment of the present invention, said at least one heating plate is the second heating plate, and said apparatus member is the upper member.

According to an embodiment of the present invention, the apparatus further comprises the corrugated protective plate.

According to an embodiment of the present invention, the apparatus is a griddle.

Figure 1:
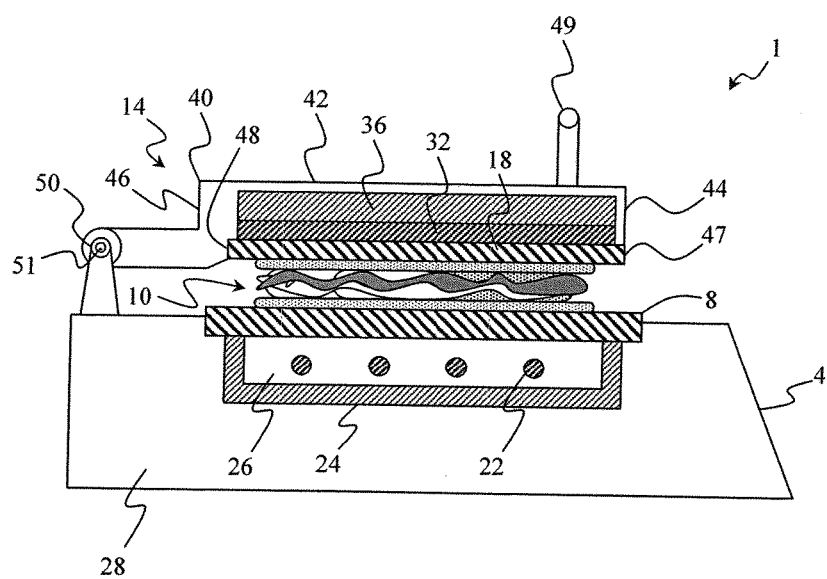
FIG. 1 is a side sectional view of a food cooking apparatus with the upper member thereof lowered into a cooking position.
Figure 2:
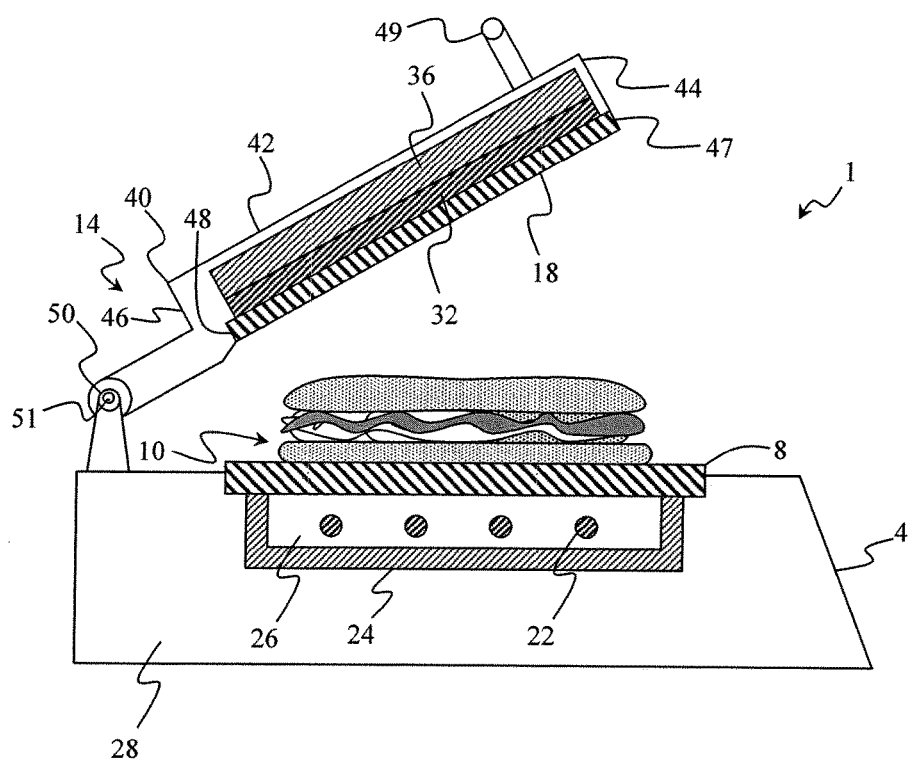
FIG. 2 is a side sectional view of the apparatus of FIG. 1 with the upper member thereof raised in a resting position.

With reference to FIGS. 1 and 2, an exemplary apparatus for cooking food products on both sides thereof, such as a griddle, is indicated with the reference numeral 1. The apparatus 1 comprises a base member 4 associated to a first heating plate 8 adapted to support food products 10 to be cooked, and an upper member 14 associated to a second heating plate 18. The upper member 14 is movable relative to the base member 4 so that, when the upper member 14 is displaced towards the base member 4, the second heating plate 18 comes to lie opposite to the first heating plate 8 so as to enclose the food products 10 therebetween.

The first heating plate 8 is arranged on a top portion of the base member 4. The base member 4 further comprises a power-supply unit of the apparatus, an electronic control panel for the different cooking programs to be set in accordance to the food products to be handled and related control electronics (not illustrated).

Preferably, a first heating device 22 is housed within the base member 4 and arranged under the first heating plate 8 for heating the latter. The first heating plate 8 is made of a material resistant to high temperatures and suitable to directly transfer the heat produced by the first heating device 22 to the food being cooked.

As shown in FIGS. 1 and 2, the first heating device 22 can be configured in the form of one or more electric resistors. The resistor is placed underneath and substantially in proximity to the first heating plate 8. In this case, the first heating plate 8 can be made of a material like glass ceramic, allowing the infrared radiation to be transferred to the food.

It can be readily appreciated that the first heating device 22 can be also provided in the form of electrically conductive layers (not shown in the figures) in contact with the first heating plate 8 and in particular with the bottom face thereof, i.e. the face opposite the one supporting the food products 10. In this case, the first heating plate 8 is advantageously made of a material with high thermal conductivity, like aluminum, or iron or cast-iron.

Expediently, the base member 4 comprises a partition element 24 made of thermally insulating material (ceramic fiber, for example) which is arranged so as to extend in a position below the first heating device 22 for thermally insulating the electric/electronic components housed in the base member 4 from the first heating device 22.

Without loosing of generality, the partition element 24, which can comprise at least a panel, divides or separates the inside of the base member 4 into a first zone or heating area 26 wherein the first heating device 22 is located and a second zone or area 28 wherein the electric and electronic components (the power-supply unit, electronic controls) are arranged in order to reduce the heat losses downwards from the heating area 26 and at the same time to convey the heat generated by the first heating device 22 towards the first heating plate 8.

Advantageously, the partition element 24 forms a housing adapted to contain the first heating device 22 and, preferably, the partition element 24 is configured as a box-like (or cup-shaped) container in which the first heating device 22 is arranged. According to a non limitative embodiment, the box-like container comprises a bottom wall and upward-oriented side walls, and it is open upwards and arranged so that the first heating plate 8 substantially closes the open side of the box-like container. The first heating plate 8 and the box-like container delimit the heating area 26 enclosing the first heating device 22 so as to ensure a thermal protection of the others members and parts of the apparatus mounted therearound against the heat generated by the first heating device 22.

Advantageously, the upper member 14 is pivotally joined to the base member so that the upper member 14 is movable relative to said base member 4. In this way, when the upper member 14 is lowered or swung towards the base member 4, the second heating plate 18 moves close to the first heating plate 8 supporting the food to be cooked 10, so as to enclose the latter therebetween.

The upper member 14 comprises a second heating device 32 arranged behind and in close proximity to the second heating plate 18 for heating the latter. As in the case of the first heating plate 8, the second heating plate 18 is made of a material resistant to high temperatures and able to efficiently transfer the heat produced by such second heating device 32 to the food being cooked (aluminium or iron or cast-iron plate or the like).

The second heating device 32 can be configured in the form of one or more electric resistors placed on top and substantially in proximity to the second heating plate 18.

Preferably, as illustrated in FIGS. 1 and 2, the second heating device 32 is configured as a substantially flat member comprising electrically conductive layers covering a top face of the second heating plate 18, i.e. the face thereof opposite to the one adapted to directly contact the food.

An insulating element 36 is located above the second heating device 32 for thermally insulating the upper section of the upper member 14 from the second heating device 32.

Preferably, the insulating element 36 is configured as a substantially flat member comprising one or more insulating layers made of thermally insulating material (for example, ceramic fibers) covering the top face of the second heating device 32, i.e., the face thereof opposite to the one in contact with the top face of the second heating plate 18.

Expediently, the upper member 14 further comprises a hollow cover element 40 housing the insulating member 36, the second heating device 32 and the second heating plate 18, leaving exposed the bottom surface of the second heating plate 18, i.e., the face thereof adapted to directly contact the food. The cover element 40 comprises a top wall 42, upward-oriented front and rear walls 44, 46 and upward-oriented side walls (not visible in FIGS. 1 and 2), and it is open downwards so that the second heating plate 18 substantially closes the open side of the hollow cover element 40. A front edge 47 of the second heating plate 18 is located at the front wall 44 of the cover element 40 and a rear edge 48 of the second heating plate 18 is located close to the rear wall 46 of the cover element 40.

The upper member 14 further comprises a handgrip member 49, for example located on the top wall 42 of the cover element 40, by means of which it is possible for the same upper member 14 to be raised and lowered between a resting, open condition and a cooking, closed condition.

The kind of movement needed to lower the upper member 14, and therefore the second heating plate 18, onto the first heating plate 8 lying therebelow can for instance be a rotary one or a simple translational one, or a combination of both. For example, as illustrated in FIGS. 1 and 2, the rear wall 46 of the cover element 40 may be provided with a protruding element rotatably coupled to the base member 4 by means of a hinging pin 50, allowing rotation of the upper member 14 about an horizontal axis 51.

Advantageously, at least one among the first heating plate 8 and the second heating plate 18 has the surface adapted to contact the food to be cooked that is corrugated, being provided with alternate crests and troughs adapted to impress branding marks on the food to be cooked similar to what might be found on food cooked on a charbroiler.

Figure 3A:
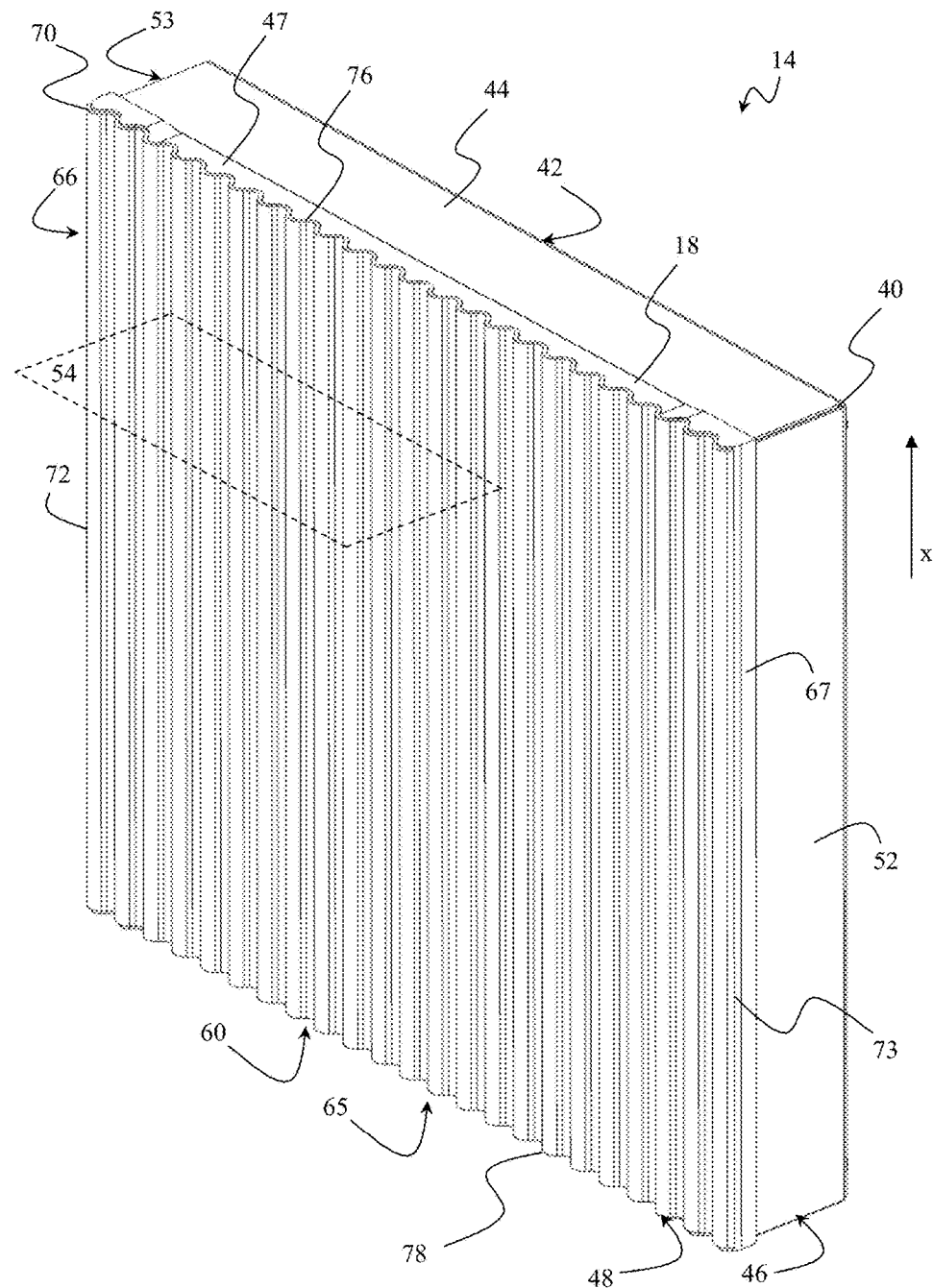
FIG. 3A is an isometric view of the upper member of the apparatus of FIGS. 1 and 2.
Figure 3B:
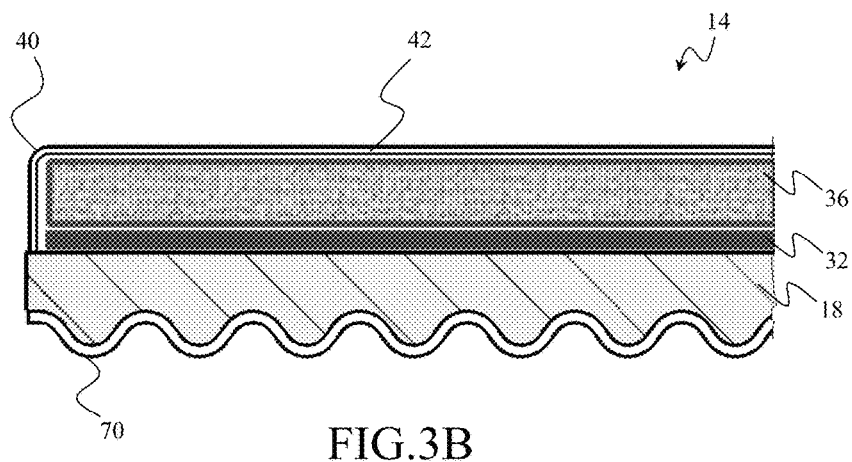
FIG. 3B is a sectional view of a portion of the upper member of FIG. 3A.

FIG. 3A is an isometric view of the upper member 14 (shown isolated, i.e. detached from the base member 4), in which the bottom surface of second heating plate 18, the front wall 44 and a side wall 52 of the cover element 40 are visible (the other side wall being identified with reference 53), while FIG. 3B is a sectional view of a portion of the upper member 14 taken along the section plane 54 of FIG. 3A. In the exemplary embodiment illustrated in FIGS. 3A and 3B, the bottom face of the second heating plate 18 is corrugated and crossed by alternate troughs 60 and crests 65 (with undulated shape, i.e. sinusoidal cross-section or similar, as illustrated in FIGS. 3A and 3B, or with a different shape, for example with triangular cross-section or similar) extending from the rear edge 48 of the second heating plate 18 at the rear wall 46 of the cover element 40 to the opposite front edge 47 at the front wall 44 of the cover element 40, i.e., along a direction x substantially parallel to lateral edges 66, 67 of the second heating plate 18. Similar considerations apply if the crests and troughs extend from a lateral edge to the opposite lateral edge of the heating plate.

Figure 3C:
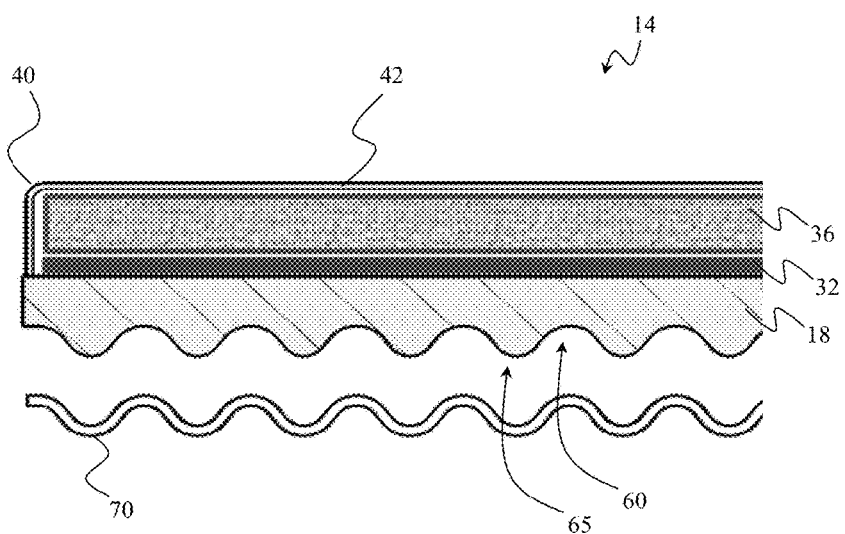
FIG. 3C is a sectional view of a portion of the upper member of FIG. 3A with the protective plate that is detached from the second heating plate.

A detachable protective plate 70 with at least one face having non-stick features is provided for avoiding food sticks to the bottom face of the second heating plate 18; the protective plate 70 is adapted to be detachably fixed to the second heating plate 18 with the face having non-stick features that is exposed and the other face that is in contact with the bottom surface the second heating plate 18. FIG. 3C is a sectional view of a portion of the upper member 14 taken along the section plane 54 of FIG. 3A with the protective plate 70 that is shown detached from the second heating plate 18. FIGS. 3A and 3B show the protective plate 70 when installed on the second heating plate 18.

In order not to reduce the thermal exchange between the food to be cooked and the second heating plate 18 and at the same time in order not to impede the generation of branding marks on the food to be cooked, the protective plate 70 is advantageously shaped so as to include crests and troughs matching the crests and troughs of the second heating plate 18. For example, the protective plate 70 may be a thin flexible corrugated sheet having a thickness of few millimeters, such as 1 millimeter, with a face thereof processed in such a way to have non-stick properties, e.g., covered by a layer of non-stick material, like Teflon®. In the embodiment illustrated in FIGS. 3A-3C, the protective plate 70 is a flexible corrugated sheet having, when the protective plate 70 is fixed to the second heating plate 18, a straight lateral edge 72 arranged to match the lateral edge 66 of the second heating plate 18, a straight lateral edge 73 arranged to match the lateral edge 67 of the second heating plate 18, a corrugated front edge 76 arranged to match the front edge 47 of the second heating plate 18, and a corrugated rear edge 78 arranged to match the rear edge 48 of the second heating plate 18.

Advantageously, once the protective plate 70 has been detached from the second heating plate 18, it can be cleaned separately, or it can be substituted by a new protective plate.

According to an embodiment of the present invention, the protective plate 70 is adapted to be detachably fixed to the second heating plate 18 by means of a releasable fixing system comprising switchable fixing elements arranged along the front and rear edges 47, 48 of the second heating plate 18, i.e., along the edges of the second heating plate 18 which extend substantially perpendicular to the direction x along which the alternate troughs 60 and crests 65 extend. Each fixing element is adapted to switch between a locked configuration, wherein the fixing element engages the protective plate 70 to exert—on a corresponding portion of the protective plate 70 close to a corrugated edge thereof arranged to match an edge of the second heating plate 18 extending substantially perpendicular to the direction x—a compression force that pushes the protective plate 70 against the second heating plate 18, to an unlocked configuration, wherein the fixing element is disengaged from the protective plate 70.

Therefore, according to an embodiment of the present invention, the protective plate 70 is fixed to the second heating plate 18 by exerting a compression force on portions of the protective plates 70 located along the corrugated edges of the protective plate 70, i.e. the edges of the protective plate 70 which extend substantially along a direction perpendicular to the direction x. In this way, it is avoided—or at least strongly reduced—the occurrence of any undesired warping in the protective plate 70 which may cause the central portion of the protective plate 70 itself to detach from the second heating plate 18.

Figure 4:
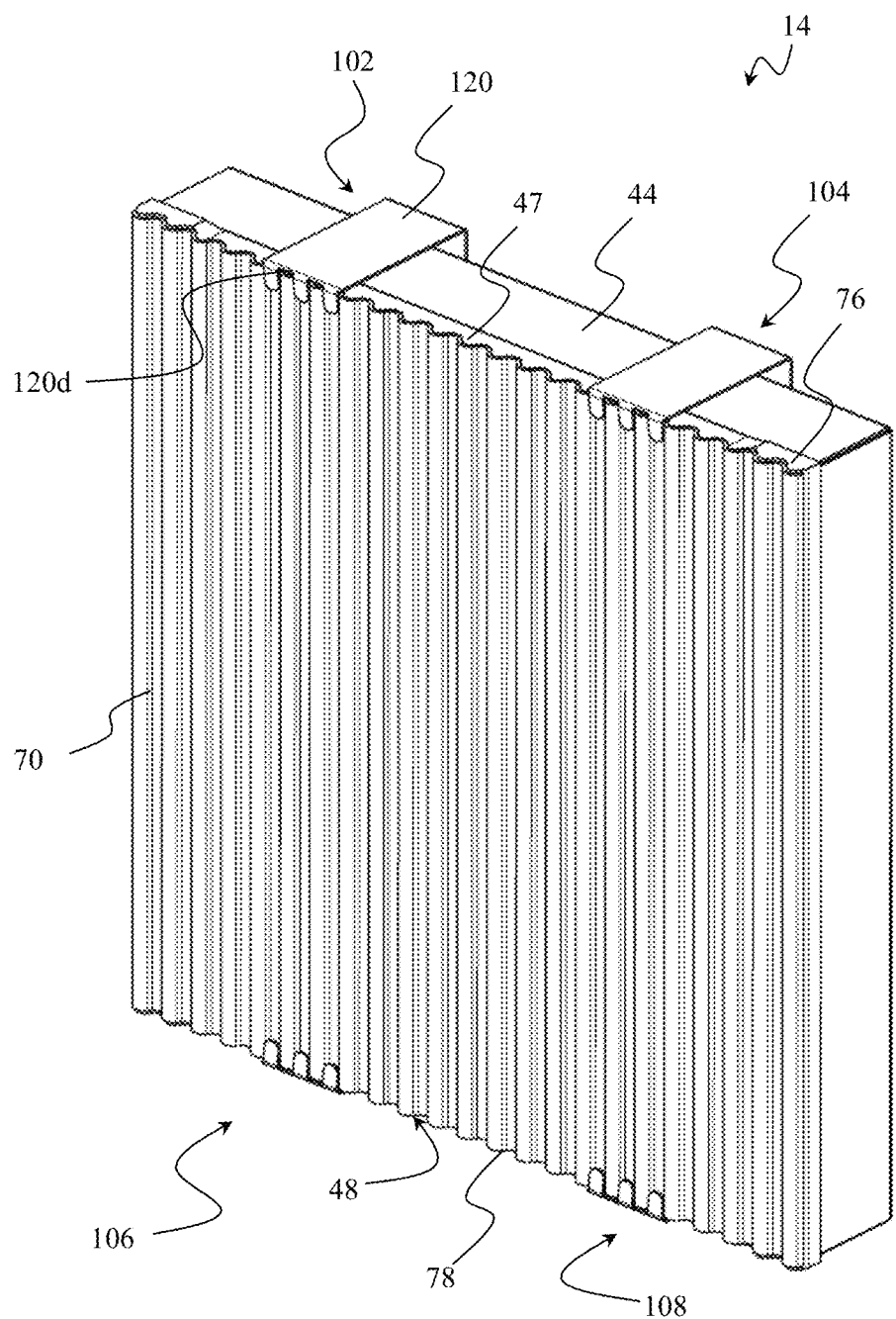
FIG. 4 illustrates a fixing system according to an embodiment of the present invention in the locked configuration.

FIG. 4 illustrates the fixing system according to an embodiment of the present invention in the locked configuration. The fixing system of FIG. 4 includes four fixing elements 102, 104, 106, 108, each one switchable from a locked configuration to an unlocked configuration. The fixing elements 102, 104 are arranged along the front edge 47 of the second heating plate 18, while the fixing elements 106, 108 are arranged along the rear edge 48 of the second heating plate 18. The fixing elements 102, 104 are adapted to exert compression force on corresponding portions of the protective plate 70 close to its front edge 76 when in the locked configuration, and the fixing elements 106, 108 are adapted to exert compression force on corresponding portions of the protective plate 70 close to its rear edge 78 when in the locked configuration. Each fixing element 102, 104, 106, 108 is mounted on the cover element 40 and includes a clamping member 120 configured to extend astride edges of the second heating plate 18, the cover element 40 and the protective plate 70 for clamping the latter against the second heating plate 18 when in the locked configuration. In the embodiment illustrated in FIG. 4, the clamping members 120 of the fixing elements 102 and 104 are configured to extend astride the front wall 44 of the cover element 40 and the front edge 47 of the second heating plate 18, and the clamping members 120 of the fixing elements 106, 108 are configured to extend astride the rear wall 46 of the cover element 40 and the bottom edge 48 of the second heating plate 18. In the embodiment illustrated in FIG. 4, each clamping member 120 of a fixing element is a flat member provided, as better described in the following, with a folded engaging end section adapted to engage the edge of the protective plate 70 corresponding to such fixing element.

Figure 5A:
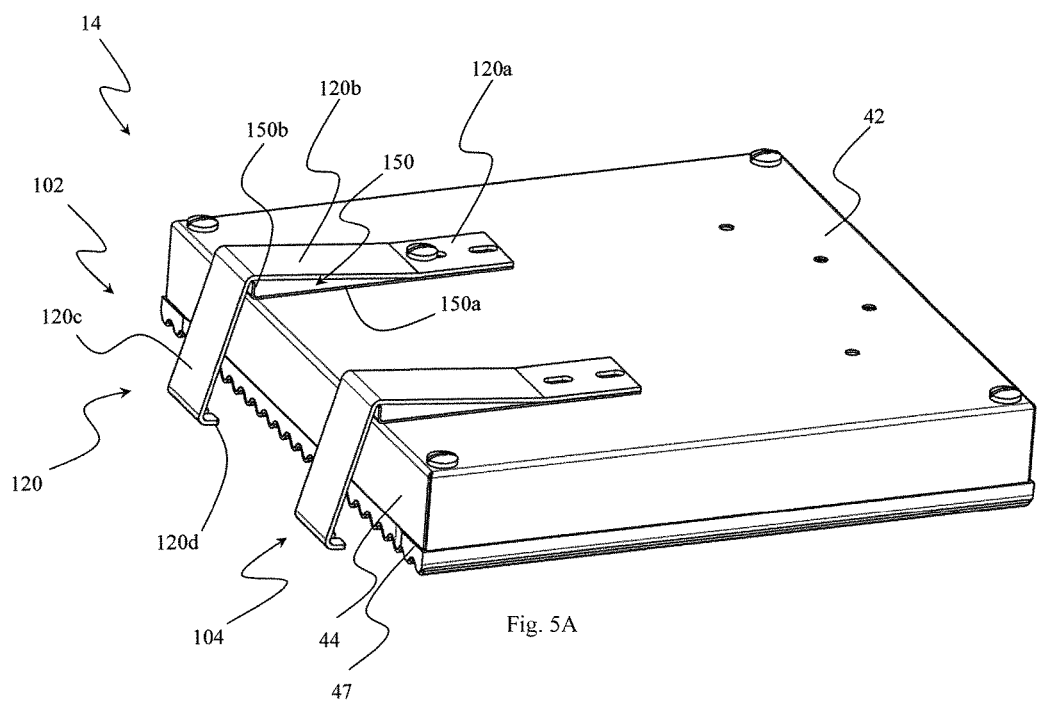
FIG. 5A is a perspective view of the fixing system according to an embodiment of the present invention in the unlocked configuration.
Figure 5B:
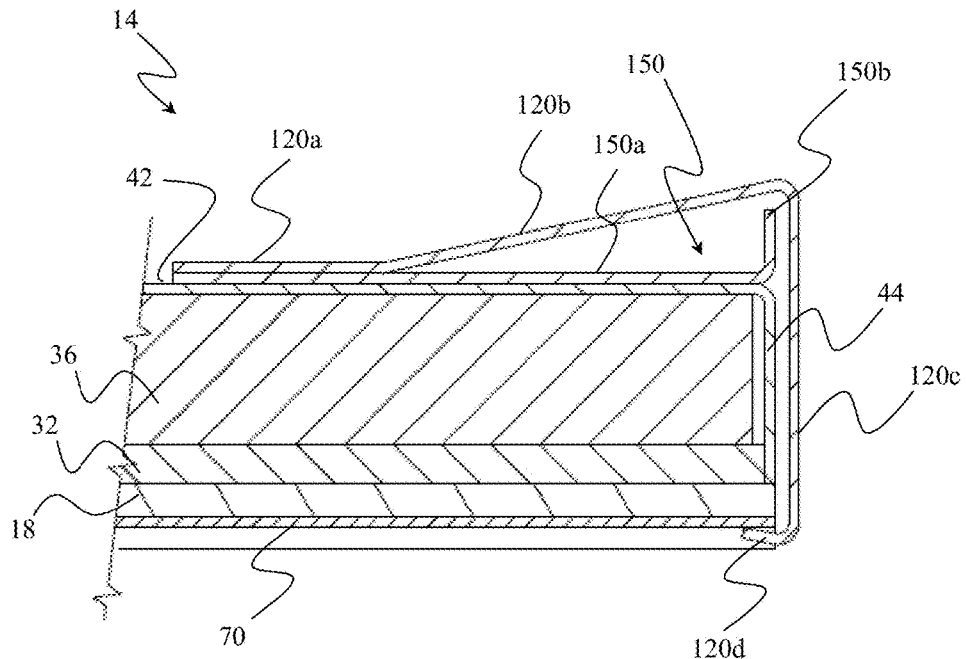
FIG. 5B is a section view of the fixing system of FIG. 5A in the locked configuration.
Figure 5C:
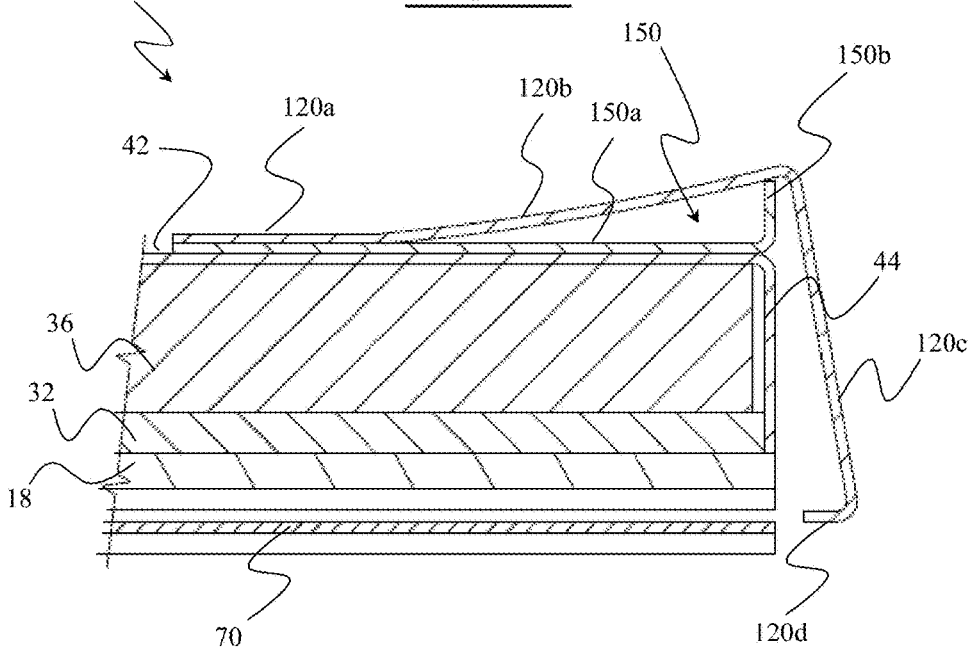
FIG. 5C is a section view of the fixing system of FIG. 5A in the unlocked configuration.

FIGS. 5A, 5B and 5C illustrate the fixing system according to an embodiment of the present invention in the unlocked configuration. FIG. 5A is an isometric view of the upper member 14, in which the front edge 47 of the second heating plate 18, the front edge 76 of the protective plate 70, the front wall 44 of the cover element 40 and a portion of the top wall 42 of the cover element 40 are visible together with the fixing element 102 (shown in the unlocked configuration).

In the embodiment illustrated in FIGS. 5A, 5B and 5C, the fixing element 102 (similar considerations apply to the other fixing elements) comprises the clamping member 120 and a hindering member 150, both preferably made of metal.

For the sake of clarity, the clamping member 120 and the hindering member 150 will be now described by considering the upper member in the lowered position, i.e., with the insulating member 36, the second heating device 32, the second heating plate 18 and the protective plate 70 substantially horizontal. It is clear that the reference directions will change according to the slant of the cover element 40.

The hindering member 150 is, like the clamping member, a flat element, substantially L-shaped, having a longest portion 150a fixed onto the top wall 42 of the cover element 40 and a shortest portion 150b laying substantially on the same plane of the front wall 44 but directed on the opposite direction, i.e., upwards, The clamping member 120 has a first portion 120a laying on, and fixed to, the longest portion 150a of the hindering member 150; a second portion 120b slightly bent upwards with respect to the first portion 120a; a third portion 120c bent downwards with respect to the second portion 120b, so as to form with the second portion 120b lower than 90° in a rest condition; and a fourth portion 120d defining a folded engaging end section, preferably including one or more teeth (e.g., three) adapted to engage corresponding troughs of the protective plate 70 when the fixing element is in the locked configuration.

In the locked condition shown in FIG. 5B, the end of the second portion 120b, laying on the same plane of front wall 44, is displaced from the top wall 42 of a distance higher than the length of the shortest portion 150b of the hindering member 150, so that the end of the second portion 120b does not touch the upper end of the shortest portion 150b. Moreover, the third portion 120c extends downwards parallel and adjacent to the front wall 44, and the engaging end section 120d engages the protective plate 70.

To switch to the unlock condition, shown in FIG. 5C, a force should be applied onto the second portion 120b, sufficient first to cause the end of the second portion 120b to come into contact with the end of the shortest portion 150b, and then to cause bending downwards of the second portion 120b. Because of this deformation of the second portion 120b, the third portion 120c is moved away from the front wall, and the engaging end section 120d disengages from the protective plate 70, thus uncoupling that portion of the protective plate 70 from the upper member 14.

Figure 6A:
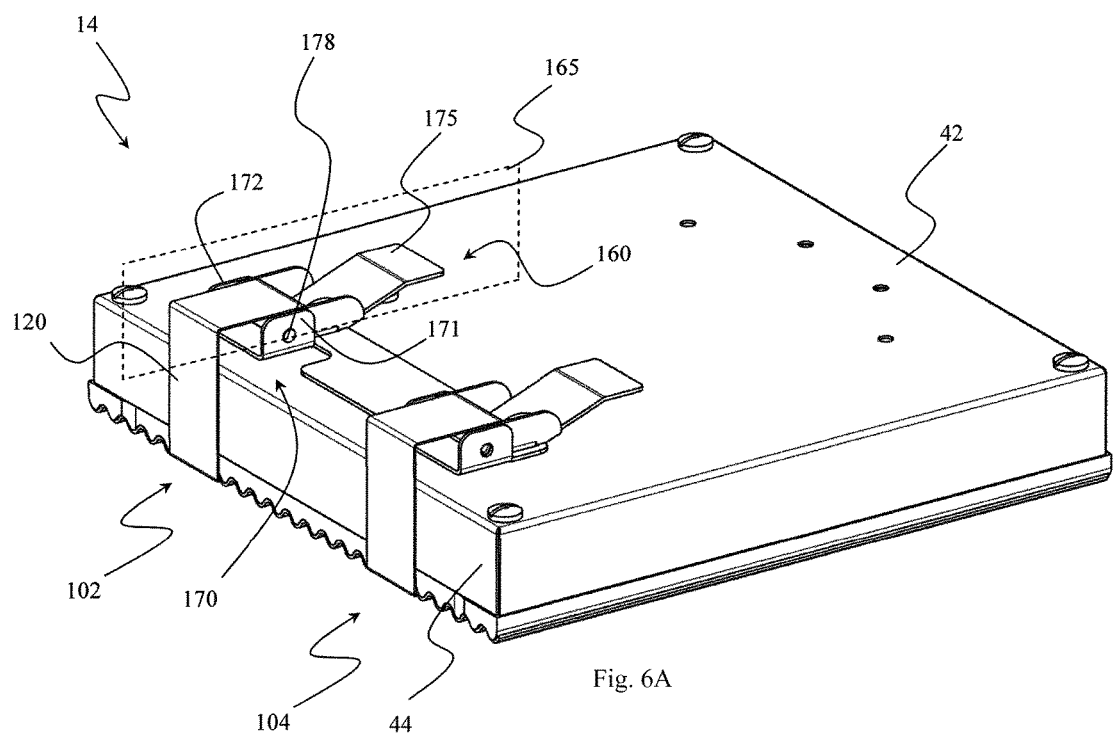
FIGS. 6A-6B are perspective view of a portion of a fixing system according to another embodiment of the present invention.
Figure 6B:
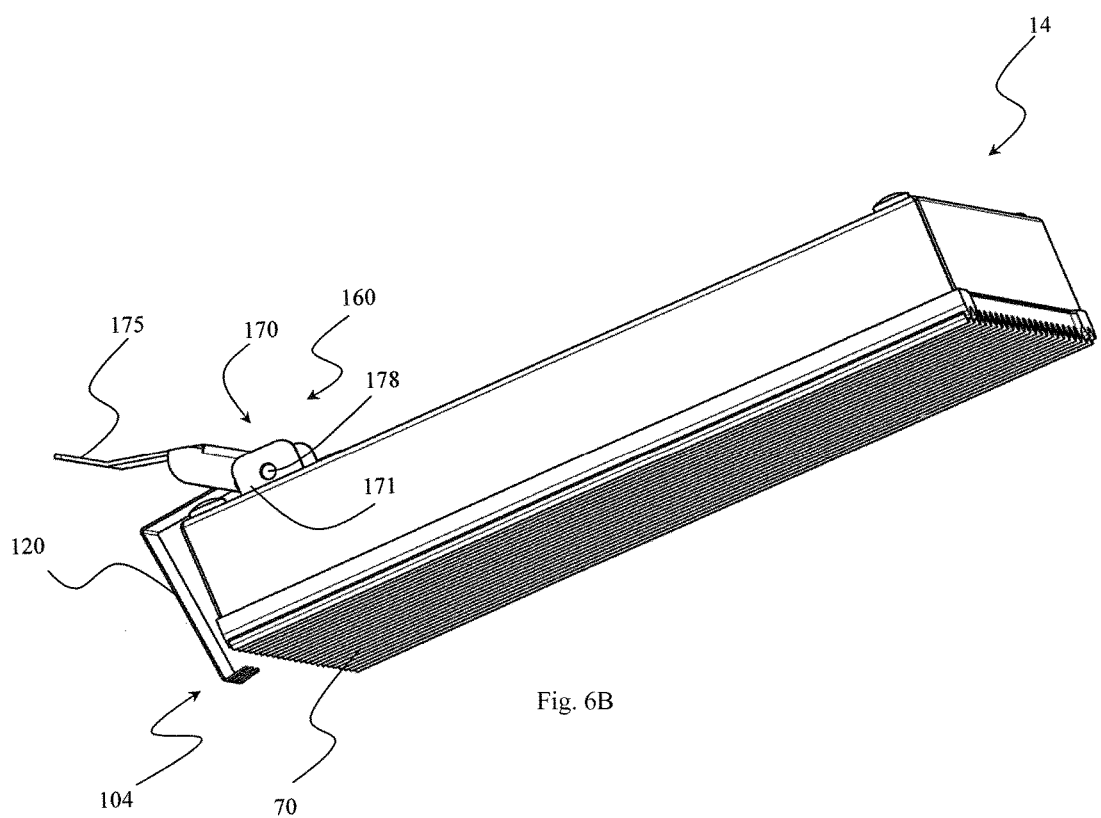
Figure 7A:
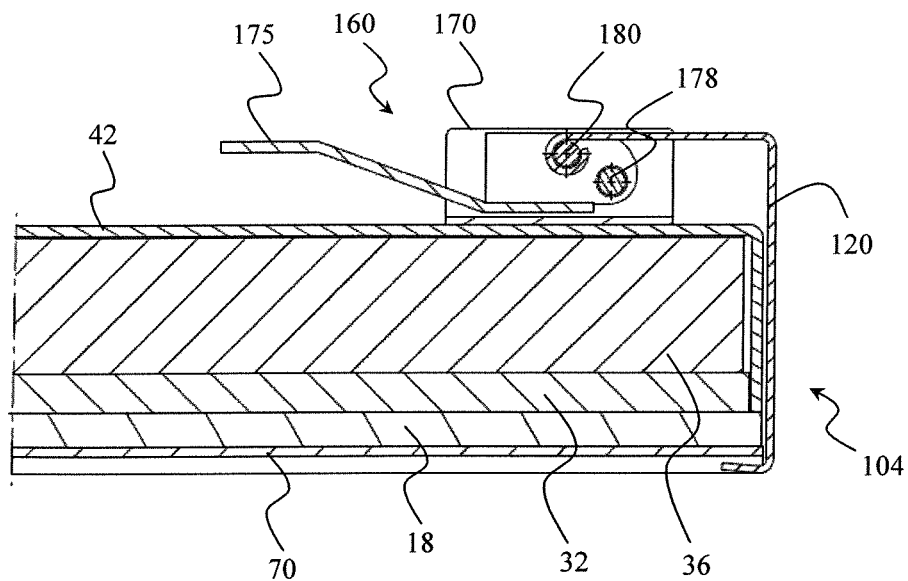
FIGS. 7A-7B are sectional view of the fixing system of FIGS. 6A-6B.
Figure 7B:
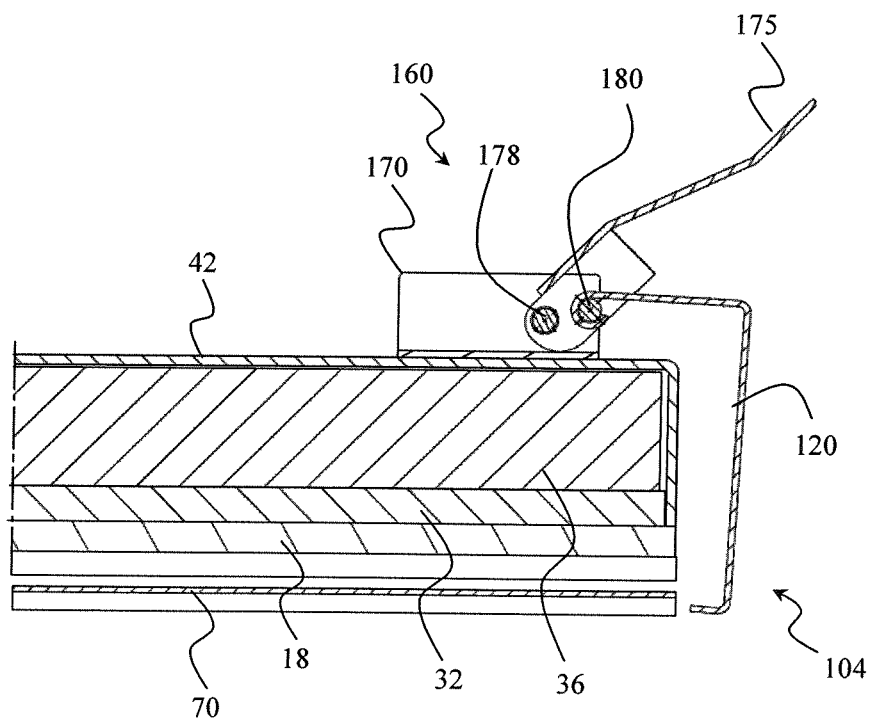

According to another embodiment of the present invention illustrated in FIGS. 6A and 6B and 7A and 7B, each one of the fixing elements 102, 104, 106, 108 comprises a respective flip locking element 160 structured as a flip-buckle. FIG. 6A is a perspective view of a portion of the upper member 14 showing the fixing elements 102 and 104 provided with the flip locking element 160 in the locked configuration, while FIG. 6B is a perspective view of a portion of the upper member 14 showing the fixing element 104 provided with the flip locking element 160 in the unlocked configuration. FIGS. 7A and 7B are sectional view of the portion of the upper member 14 shown in FIGS. 6A and 6B taken along the section plane 165 in the locked and in the unlocked configuration, respectively.

Without loosing of generality, the flip locking element 160 comprises a frame structure 170 mounted on the top wall 42 of the cover element 40, and a handle member 175 rotatably coupled to the frame structure 170. For example, the frame structure 170 includes two wall sections 171, 172 protruding from the top wall 42 of the cover element 40 and extending along the direction x, and the handle member 175 is rotatably mounted on the frame structure 170 by means of a hinging pin 178 fitted in two faced holes located on said two walls 171, 172. According to this embodiment, the clamping member 120 is rotatably mounted on the handle member 175, for example by means of a further hinging pin 180 fitted in two faced holes located on two faced walls section of the handle member 175, so that the rotation axis of the handle member 175 with respect to the frame structure 170 is parallel to the rotation axis of the clamping member 120 with respect to the handle member 175.

In the locked configuration (FIGS. 6A and 7A), the handle member 175 is in a position substantially parallel to the top wall 42 of the cover element 40 (and thus to the second face of the heating plate 18), and the clamping member 120 clamps the protective plate 70 against the second heating plate 18. In order to release the protective plate 70, the fixing element 104 (similar considerations apply to the other fixing elements) is brought to the unlocked configuration by rotating the handle member 175 around the hinging pin 178. As the handle member 175 rotates around the hinging pin 178, the position of the further hinging pin 180 translates with respect to the upper member 14, until the clamping member 120 disengages the protective plate 70. Once the fixing elements have been unlocked, the protective plate 70 may be easily detached from the second heating plate, in such a way to be cleaned separately or substituted by a new protective plate.

Naturally, in order to satisfy local and specific requirements, a person skilled in the art may apply to the solution described above many logical and/or physical modifications and alterations.

For example, although this solution has been described with a certain degree of particularity with reference to a fixing system adapted to detachably fix a protective plate to the heating plate located in the upper member of the cooking apparatus—i.e., the second heating plate 18—, similar considerations apply in case a further fixing system is provided (either in addition to or in substitution of the above described fixing system) adapted to detachable fix a protective plate to the heating plate located in the base member of the cooking apparatus—i.e., the first heating plate 8. In this case, the fixing members are mounted on the base member and arranged along the edges of the first heating plate.

Moreover, even if reference has been explicitly made to a fixing system including fixing elements arranged along the top and bottom edges of the heating plate(s), similar considerations apply if the fixing system includes fixing elements arranged along the lateral edges of the heating plate(s), provided that the crests and troughs on the heating plate(s) horizontally extend along the protective plate(s) from a lateral edge to the other one.

Mixed solutions are also contemplated, in which fixing elements are provided both on the top/bottom edges and on the lateral edges of the heating plate(s).

Furthermore, even if the fixing system which has been described in detail includes four fixing elements, and specifically two fixing elements for the top edge of the heating plate and two fixing elements for the bottom edge of the heating plate, similar considerations apply in case the number of fixing elements is different than two.

The invention claimed is:

1. An apparatus for cooking food products, the apparatus including at least one heating plate having a surface provided with alternate crests and troughs, the apparatus comprising a fixing system adapted to detachably fix a corrugated protective plate, having a non-stick face, to said heating plate, the corrugated protective plate having a first and a second corrugated edge and having alternate crests and troughs extending from the first to the second corrugated edge and adapted to match the alternate crests and troughs of the heating plate when the corrugated protective plate is fixed to the heating plate, characterized in that said fixing system comprises fixing elements adapted to exert a force on corresponding portions of the protective plate close to the first or the second corrugated edge so as to push the protective plate against the heating plate.

2. The apparatus of claim 1, wherein each fixing element is switchable between:

a locked configuration, in which the fixing element engages the protective plate to exert a force on the corresponding portion of the protective plate close to the first or the second corrugated edge, respectively, and an unlocked configuration, in which the fixing element is disengaged from the protective plate.

3. The apparatus of claim 2, wherein:

the apparatus includes an apparatus member supporting the heating plate, the alternate crests and troughs of the heating plate extend along a first direction;

the heating plate has a first and a second edge opposite to each other and substantially perpendicular to the first direction; and each fixing element is mounted on the apparatus member and includes a respective clamping member having at least a portion adapted to extend astride the first or the second edge and the first or the second corrugated edge of the protective plate, when in the locked configuration.

4. The apparatus of claim 3, wherein the clamping member of each fixing element is a flat member provided with a folded engaging section adapted to engage the protective plate when the fixing element is in the locked configuration.

5. The apparatus of claim 4, wherein said folded engaging section includes at least one tooth adapted to engage a corresponding trough of the protective plate when the corresponding fixing element is in the locked configuration.

6. The apparatus of claim 4, wherein the clamping member has an elastically deformable portion so designed that when no force is applied on it, the folded engaging section can engage the protective plate, and when a force sufficient to deform it is applied on it, the folded engaging section is displaced from the protective plate.

7. The apparatus of claim 4, wherein:
each fixing element includes a respective hindering member comprising a first hindering portion mounted on the apparatus member and a second hindering portion protruding from the apparatus member
each clamping member comprises a first clamping portion fixed to the first hindering portion, a second clamping portion bent with respect to the first clamping portion so as to extend away from the apparatus member, and a third clamping portion bent with respect to the second clamping portion so as to extend astride the first or the second edge of the heating plate and the first or the second corrugated edge of the protective plate when in the locked configuration, the folded engaging section being connected to the third clamping portion.

8. The apparatus of claim 7, wherein:
when a fixing element is in the locked configuration, the respective second clamping portion is displaced from the apparatus member of a distance higher than the length of the second hindering portion, the fixing element being adapted to be switched to the unlocked configuration by exerting a force on the second clamping portion sufficient to cause the second clamping portion to come into contact with the second hindering portion and cause bending of the second clamping portion.

9. The apparatus of claim 3, wherein each fixing element includes a respective flip locking element comprising:
a frame structure mounted on the apparatus member, and
a handle member rotatably coupled to the frame structure, and wherein:
the clamping member is rotatably coupled to the handle member, a first rotation axis of the handle member with respect to the frame structure being parallel to a second rotation axis of the clamping member with respect to the handle member.

10. The apparatus of claim 9, wherein:
when the fixing element is in the locked configuration, the handle member is in a position substantially parallel to the heating plate;
the fixing element is adapted to be switched between the locked configuration and the unlocked configuration by rotating the handle member with respect to the frame structure so as to translate the second rotation axis with respect to the apparatus member.

11. The apparatus of claim 1, wherein the apparatus comprises:
a base member associated to a first heating plate adapted to support food products to be cooked, and
an upper member associated to a second heating plate, the upper member being movable relative to the base member so that, when the upper member is displaced towards the base member, the second heating plate comes to lie opposite to the first heating plate so as to enclose the food products therebetween
and wherein said at least one heating plate is defined by said first heating plate or by said second heating plate.

12. The apparatus of claim 10, wherein:
said at least one heating plate is the second heating plate, and
said apparatus member is the upper member.

13. The apparatus of claim 1, further comprising the corrugated protective plate.

14. The apparatus of claim 1, wherein the apparatus is a griddle.

15. The apparatus of claim 1, wherein the corrugated protective plate comprises a first surface and an opposing second surface that both include alternate crests and troughs that match the alternate crests and troughs of the heating plate.

16. The apparatus of claim 15, wherein the crests of the first surface correspond with the troughs of the second surface and the troughs of the heating plate, further wherein the troughs of the first surface correspond with the crests of the second surface and the crests of the heating plate.

17. The apparatus of claim 1, wherein the corrugated protective plate comprises a first surface that faces the heating plate and a second surface that opposes the first surface and faces away from the heating plate, further wherein a profile of the second surface matches a profile of the heating plate.

* * * * *